United States Patent Office 3,405,005
Patented Oct. 8, 1968

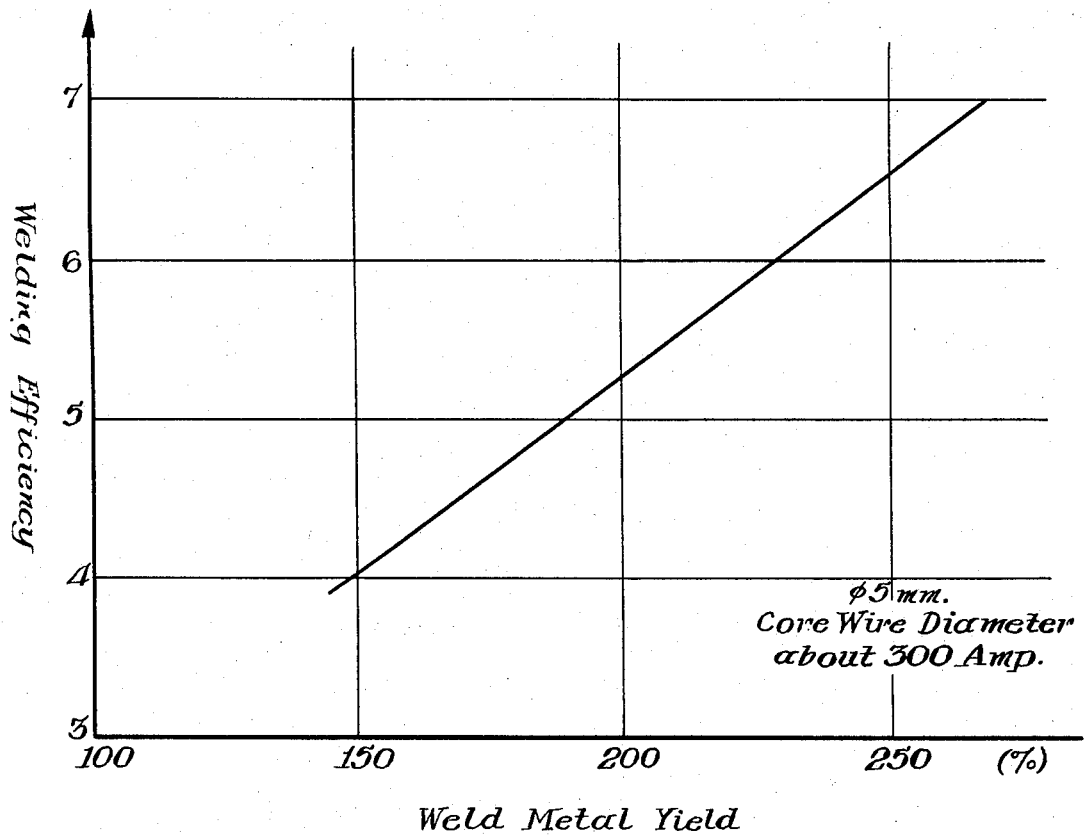

3,405,005
WELDING ELECTRODE
Klaus Feldmann, Hermulheim, near Cologne, Werner Zschaage, Oberursel, Taunus, Paul Schmidt, Frankfurt am Main-Griesheim, Klaus Frank, Hermulheim, near Cologne, and Joachim Kandler, Bruhl, near Cologne, Germany, assignors to Knapsack Aktiengesellschaft, Knapsack, near Cologne, Germany, a corporation of Germany
Filed Apr. 28, 1965, Ser. No. 451,571
Claims priority, application Germany, May 23, 1964, K 53,020
9 Claims. (Cl. 117—207)

ABSTRACT OF THE DISCLOSURE

An extruded type of welding electrode comprising an iron core wire and a sheathing material surrounding and adhered to the core wire, the sheathing material containing as an additive 65–85% by weight iron powder having an apparent bulk factor of at most 26.5 cc. and a vibration bulk factor of at most 24 cc. per 100 grams iron powder and consisting to an extent of at least 90% of granular matter having a smooth and rounded-off surface area.

---

High performance electrodes, i.e. electrodes surrounded by an electrode sheathing containing relatively large amounts of iron which serves to increase the rate of fused weld metal, are becoming increasingly used to even permit untrained welders to achieve welding at a high rate of efficiency.

Figure 1:
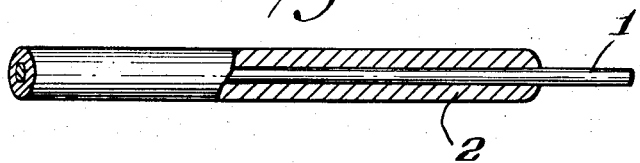

In the accompanying drawings, FIG. 1 represents a welding electrode, partially in section. The electrode comprises a core wire 1 which furnishes the weld metal and generally consists of unalloyed or low-alloyed steel low in carbon (less than 5% by weight of accompanying elements, e.g. Si, Mn), and a sheathing 2 surrounding and adhered to the said core wire, the sheathing being inter alia intended to form scale adapted to the liquid weld metal and being therefore required to contain basic material necessary to achieve that effect.

The scale should be composed to wet and thereby protect metal droplets on being passed through an arc and to ultimately cover the hot melt. After cooling, the scale should be easy to remove from the solidified melt. Also, the sheathing or jacketing composition should enable the arc to be stabilized and the liquid metal to be prevented from absorbing atmospheric substances.

Depending on composition, the sheathing masses for extruded type of welding electrodes can substantially be classified into sheathing masses of the ore-acid, titanium-acid, and lime-basic type, respectively.

Figure 2:

FIG. 2 represents a sectional view of the welding electrode shown in FIG. 1, wherein the core wire is clamped at 3 to the electrode holder with an electrode crater being formed at 4 during use.

Welding efficiency (kg. weld metal per hour) generally increases as the weld metal yield increases. As used herein, the term "weld metal" is understood to mean the amount of iron fused e.g. onto an iron plate and determined by differential weighing, and the term "weld metal yield" is understood to mean the amount by weight of weld metal divided by the amount by weight of fused core wire. In the weld metal yield percentage, the core metal is 100%.

Figure 3:
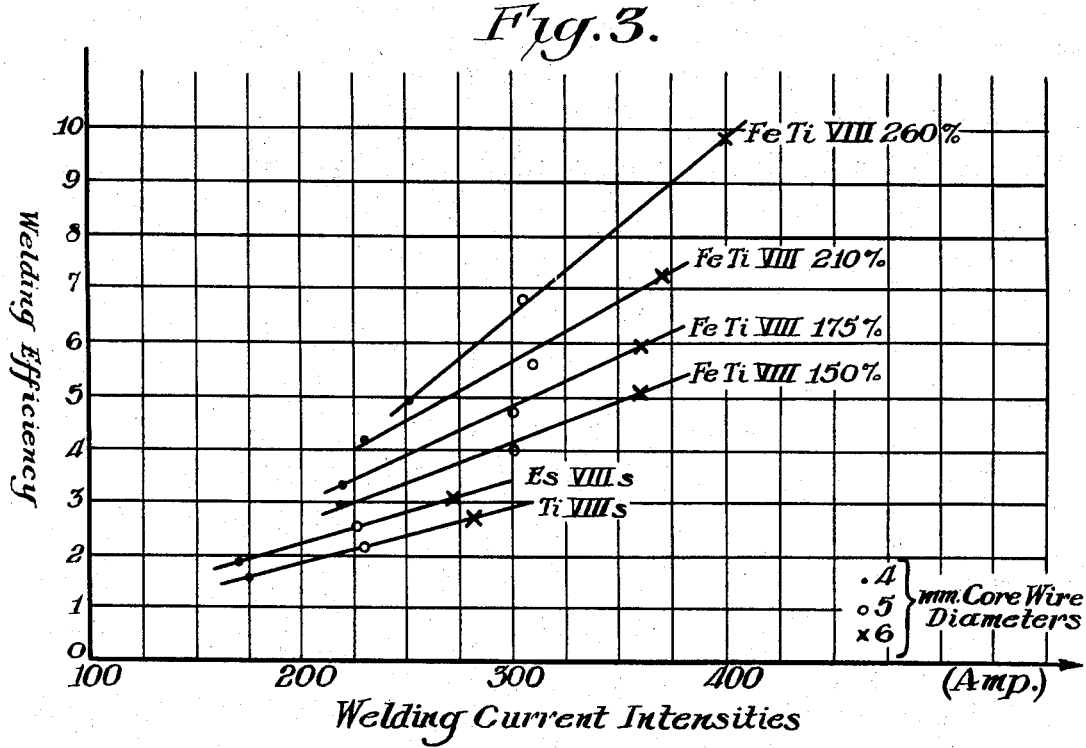

The diagram represented in FIG. 3 shows the welding efficiently of some electrode types for core wires having a diameter of 4, 5 and 6 mm., respectively, and accordingly for various current intensities. The following electrode types were compared, the electrode designations corresponding to the mechanical quality factors indexed in DIN 1913 (German Industrial Standard): a Ti (VIII) electrode (titanium-acid type sheathing; weld metal yield: 97%); an Es (VIII) electrode (ore-acid type sheathing; weld metal yield: 105%); and four FeTi (VIII) high performance electrodes (titanium-acid type sheathing; weld metal yield: 150, 175, 210 and 260%, respectively). As shown, maximum weld efficiency was achieved with weld metal yields of 260%.

Increasing the weld metal yield to a value above 230%, related to the weight of fused core wire, by conventional means will result in reduced weldability. If the diameter of the sheathing is increased for a constant diameter of the core wire, which was necessary heretofore to increase the absolute iron powder content of the sheathing, the electrode will become too heavy and unhandy for permanent use. Also, scale manipulation is impeded especially in butt welds and T joints, and roof penetration is impaired. A butt weld is a joint weld where plates to be joined together are coplanar and have bevelled edges facing each other. The gap of V-shaped cross section so formed is filled with weld metal. A T-joint is a joint weld where a plate is fixed in upright position onto another plate. For welding, the electrode is passed along the contacting edge of the plate in upright position to fill weld metal near the vertex into the 90° angle between the two plates. Good root penetration is achieved when the contacting edge of the plate in upright position is fused (cf. DIN 8551).

Increasing the weld metal yield by increasing the proportion of iron in the electrode sheathing with conventional iron powder having an apparent bulk factor of 27 cc./100 gram or more (vibration bulk factor: 24 cc./100 gram or more) will result in the electrode forming a crater with a conductivity higher than to ensure limitation of the arc to the core wire, so that perfect welding will be impossible. The term "apparent bulk factor" is understood to mean the volume the powder poured into a measuring vessel occupies therein, which can be read off from a measuring mark (cf. DIN 53468). The term "vibration bulk factor" is understood to mean the volume occupied by the powder in the measuring vessel after intense stamping and vibrating action.

The present invention unexpectedly provides a process for making electrodes yielding 240% and more weld metal by surrounding the electrodes with sheathing material containing as an additive iron powder having an apparent bulk factor and a vibration bulk factor lower than indicated above, the iron powder consisting of smooth and rounded-off, preferably spherically shaped granular matter having a fairly low degree of porosity associated with an appropriate grain size distribution, e.g. of about 30% grains having a diameter larger than 0.2 mm. and of about 25% grains having a diameter of 0.1 to 0.2 mm. with the balance grains having a diameter of less than 0.1 mm.

In FIG. 3 there are plotted the test points of the uppermost straight line (curve) of an electrode FeTi VIII 260%. The test points were obtained with a high performance electrode yielding 260% weld metal, prepared according to the present invention to contain as an additive in the sheathing material iron powder with an apparent bulk factor of less than 25 cc./100 gram. The test points of the other straight lines (curves) were determined with conventional electrodes. FIG. 4 shows especially drastically how welding efficiency increases by using high performance electrodes with high weld metal yields prepared in accordance with the present invention. FIG. 4 shows a parameter taken from FIG. 3 for a core wire 5 mm. wide and a welding current intensity of about 300 amperes.

The iron powder should preferably contain chemically bound oxygen which enables the silicon content in the weld metal to be substantially reduced without any excessive oxidation and scorification of the manganese content of sheathing and core wire. This permits ready adjustment of a silicon content desired in the weld metal.

The iron powder suggested to be used in accordance with the present invention can be prepared in conventional manner, e.g. by atomizing liquid iron with the aid of high-pressure gases or liquids maintained under pressure, or on discs rotated by centrifugal forces, on granulating plates or similar means. Preparation of the powder is not critical for its application. When the iron powder described above is used, the electrode sheathing may contain 70 or more percent metallic iron without the electrode giving rise to any formation of shunted arcs caused by excessive conductivity on inadvertent contact with a workpiece, or incurring impaired welding properties.

The electrode sheathing material may be composed as described below. It is understood, however, that these are not necessarily optimum compositions.

Titanium-acid type sheathing: 75 kg. iron powder, 7 kg. ferromanganese containing about 80% by weight manganese, 9 kg. rutile ($TiO_2$), 2 kg. petalite $$(Li,Na[AlSi_4O_{10}])$$

1 kg. kaoline (substantially kaolinite: $Al_2[Si_2O_5](OH)_4$), and 1 kg. alginate (alginic acid salt) were mixed and about 10 liters potassium water glass having a density of 1.32 grams/cm.³ were added.

Lime-basic type sheathing: 75 kg. iron powder, 3 kg. ferromanganese containing about 80% by weight manganese, 8 kg. marble ($CaCO_3$), 4 kg. fluorspar ($CaF_2$), 2 kg. quartz ($SiO_2$), 2 kg. bentonite (substantially montmorillonite $Al[Si_2O_5]OH$), and 1 kg. alginate were mixed and about 7 liters potassium water glass having a density of 1.32 were added.

Electrodes of the type described are generally sheathed under a pressure of more than 350 atmospheres absolute. They are thereby given good welding properties associated with a good resistance of the sheathing to tearing on drying. Consumption of binding agents is rather limited.

The present invention provides more especially an extruded type of welding electrode comprising an unalloyed or low-alloyed iron core wire and a sheathing material surrounding and adhered to said core wire, the sheathing material containing as an additive iron powder having an apparent bulk factor not exceeding 26.5 cc. and a vibration bulk factor not exceeding 24 cc. per 100 grams iron powder and consisting to an extent of at least 90% of granular matter having a smooth and rounded-off surface area. Preferably, the iron powder used as an additive in the sheathing material has an apparent bulk factor of 20–21 cc. and a vibration bulk factor of 18–19 cc. per 100 grams iron powder, and preferably contains 0.5 to 5% by weight of chemically bound oxygen. An at least 50% by weight proportion of the smooth and rounded-off iron powder grains should have a spherical or substantially spherical shape. Also, the grains should have a fairly compact internal structure.

The sheathing material is generally composed of:

| | Parts by weight |
|---|---|
| Iron | 65–85 |
| Ferromanganese | 5–10 |
| Rutile | 5–15 |
| Petalite | 0–3 |
| Kaoline | 0–2 |
| Potassium alginate | 0.2–2 |
| Potassium water glass (dry substance) | 3–6 | or is composed of:

| | |
|---|---|
| Iron | 65–85 |
| Ferromanganese | 2–5 |
| Marble | 5–10 |
| Fluorspar | 2–6 |
| Quartz | 0–5 |
| Bentonite | 0–3 |
| Sodium alginate | 0.2–2 |
| Potassium water glass (dry substance) | 2–4 |

We claim:

1. An extruded type of welding electrode comprising an iron core wire and a sheathing material surrounding and adhered to said core wire, the sheathing material containing as an additive 65–85% by weight iron powder having an apparent bulk factor of at most 26.5 cc. and a vibration bulk factor of at most 24 cc. per 100 grams iron powder and consisting to an extent of at least 90% of granular matter having a smooth and rounded-off surface area.

2. An extruded type of welding electrode as claimed in claim 1, wherein the iron powder additive has an apparent bulk factor of 20 to 21 cc. and a vibration bulk factor of 18 to 19 cc. per 100 grams iron powder.

3. An extruded type of welding electrode as claimed in claim 1, wherein the iron powder additive contains 0.5 to 5% by weight chemically bound oxygen.

4. An extruded type of welding electrode as claimed in claim 1, wherein an at least 50% proportion of the smooth and rounded-off granular iron powder additive has an at least substantially spherical shape.

5. An extruded type of welding electrode as claimed in claim 1, wherein the granular iron powder additive has a substantially compact internal structure.

6. An extruded type of welding electrode as claimed in claim 1, wherein the sheathing material is composed of:

| | Parts by weight |
|---|---|
| Iron | 65–85 |
| Ferromanganese | 5–10 |
| Rutile | 5–15 |
| Petalite | 0–3 |
| Kaoline | 0–2 |
| Potassium alginate | 0.2–2 |
| Potassium water glass (dry substance) | 3–6 |

7. An extruded type of welding electrode as claimed in claim 1, wherein the sheathing material is composed of:

| | Parts by weight |
|---|---|
| Iron | 65–85 |
| Ferromanganese | 2–5 |
| Marble | 5–10 |
| Fluorspar | 2–6 |
| Quartz | 0–5 |
| Bentonite | 0–3 |
| Sodium alginate | 0.2–2 |
| Potassium water glass (dry substance) | 2–4 |

8. An extruded type of welding electrode as claimed in claim 1, wherein an unalloyed iron core wire is used.

9. An extruded type of welding electrode as claimed in claim 1, wherein a low-alloyed iron core wire is used.

References Cited

UNITED STATES PATENTS

| 2,730,465 | 1/1956 | Willigen | 117—206 |
| 2,855,333 | 10/1958 | Wasserman et al. | 117—207 XR |
| 2,876,151 | 3/1959 | Helin et al. | 148—26 |

WILLIAM L. JARVIS, *Primary Examiner.*